No. 679,990. Patented Aug. 6, 1901.
E. W. PRATT.
GATE.
(Application filed Apr. 10, 1901.)
(No Model.)
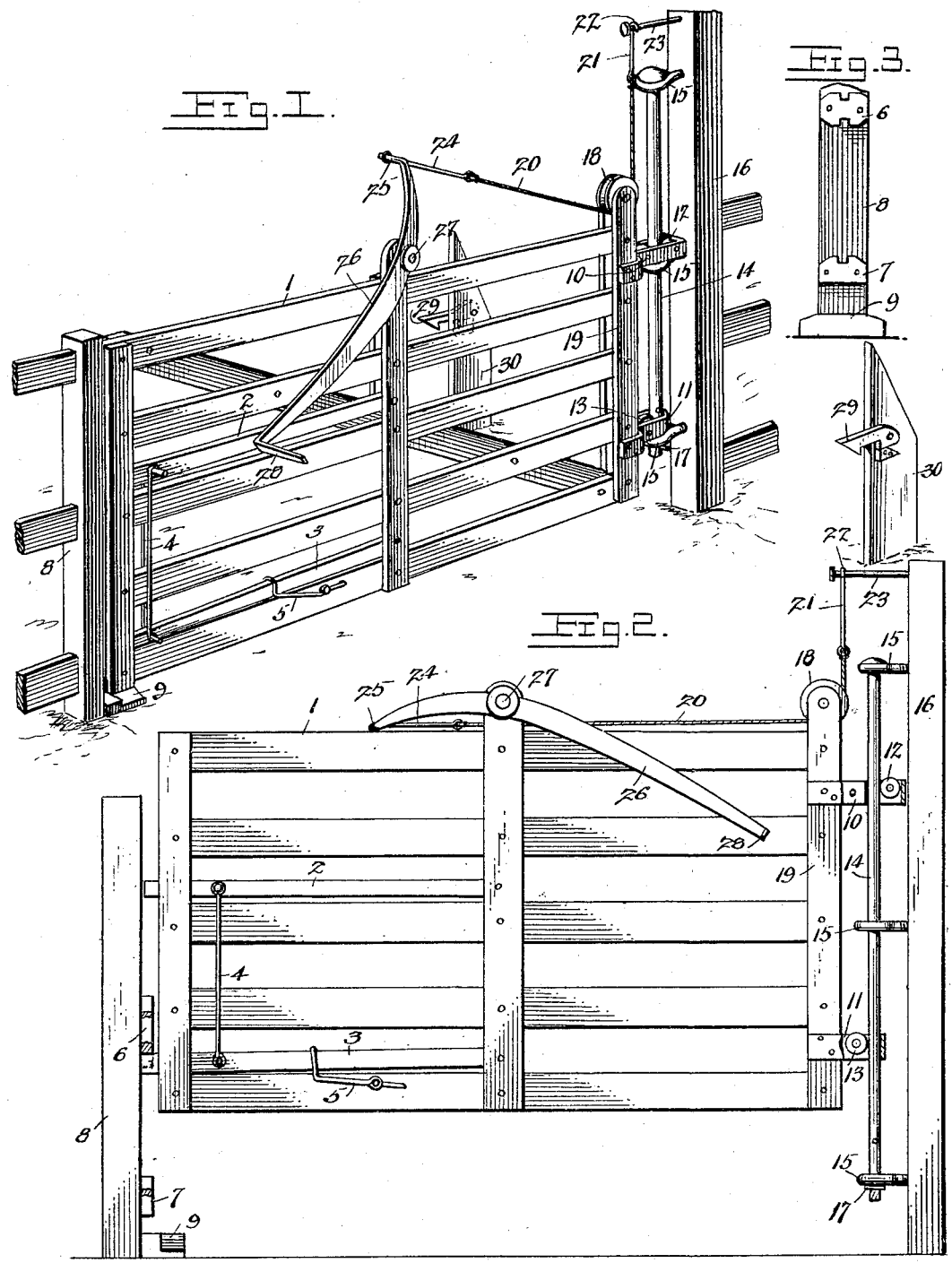
Witnesses
F. E. Alden.
J. H. Riley
E. W. Pratt, Inventor
by C. A. Snow & Co.
Attorneys

UNITED STATES PATENT OFFICE.

EBER W. PRATT, OF IPAVA, ILLINOIS, ASSIGNOR OF ONE-HALF TO GEORGE W. BIRD AND GEORGE W. GLORE, OF SAME PLACE.

GATE.

SPECIFICATION forming part of Letters Patent No. 679,990, dated August 6, 1901.

Application filed April 10, 1901. Serial No. 55,243. (No model.)

*To all whom it may concern:*

Be it known that I, EBER W. PRATT, a citizen of the United States, residing at Ipava, in the county of Fulton and State of Illinois, have invented a new and useful Gate, of which the following is a specification.

The invention relates to improvements in gates.

One object of the present invention is to improve the construction of swinging gates and to provide a simple and comparatively inexpensive one which will be strong and durable and adapted to open in either direction.

A further object of the invention is to provide a gate of this character adapted to be arranged at an elevation to enable it to swing clear of snow-drifts and other obstructions and to provide a passage for small animals, such as hogs and sheep, to enable the same to be separated from other stock.

The invention consists in the construction and novel combination and arrangement of parts hereinafter fully described, illustrated in the accompanying drawings, and pointed out in the claims hereto appended.

In the drawings, Figure 1 is a perspective view of a gate constructed in accordance with this invention. Fig. 2 is a side elevation, partly in section, the gate being elevated. Fig. 3 is a detail view of a portion of the latch-post, illustrating the construction of the upper and lower keepers.

Like numerals of reference designate corresponding parts in all the figures of the drawings.

1 designates a swinging gate designed to be constructed either wholly of wood, as shown in the accompanying drawings, or partly of wood and wire or other material, and provided with upper and lower latch-bars 2 and 3, pivoted at their inner ends and connected by rods 4, located at opposite sides of the gate and adapted to cause the latches to operate in unison. The lower latch-bar is engaged by a spring 5, which is mounted on the gate and which is adapted to hold both of the latch-bars in engagement with upper and lower keepers 6 and 7 of a latch-post 8 when the gate is arranged as shown in Fig. 1. The keepers preferably consist of blocks secured to the latch-post 8 and provided with opposite beveled edges arranged at opposite sides of recesses which are adapted to receive the latch-bars. The upper keeper 6 is a double one, being provided at its upper and lower edges with recesses and beveled portions, the lower recess being designed to be engaged by the lower latch-bar when the gate is elevated, as hereinafter explained. The latch-post is also provided at its bottom with a block 9, adapted to receive the front end of the gate to relieve the hinges of strain and to prevent the gate from sagging.

The gate is provided with upper and lower hinges or leaves 10 and 11, preferably consisting of loops constructed of stout strap-iron or other suitable material and provided with upper and lower antifriction wheels or pulleys 12 and 13, located in rear and in advance of a continuous pintle-rod 14. The lower antifriction-wheel is located in advance of the pintle-rod, and the upper antifriction-wheel is arranged in rear of the pintle-rod, the gate holding the antifriction-wheels in contact with the rod. The pintle-rod is supported by suitable eyes 15, extending from a hinge-post 16. These eyes may be of any desired number, and the lower portion of the pintle-rod is provided with perforations for the reception of a key 17 for holding the rod against upward movement, and, if desired, a key or pin may be passed through the pintle-rod above the leaf to hold the gate against vertical movement.

The gate is provided at its top with a pulley 18, arranged at the rear end of the gate and preferably mounted between extensions of the rear end bars 19 and provided with a groove receiving a flexible connection 20, which may consist of a rope, chain, cable, or the like. The upper end of the flexible connection is secured to the lower end of a link 21, provided at its lower end with an eye to receive the flexible connection and having a hook 22 at its upper end to engage a horizontal arm 23, preferably consisting of a fastening device extending outward from the hinge-post 16. The other end of the flexible connection is secured to a link 24, provided at its ends with eyes secured to the flexible connection and to a lateral projection 25 of a lever 26. The lever 26, which is fulcrumed between its ends at the center of the gate, is slightly curved, and the fulcrum or pivot 27 is arranged at the top of the central vertical bar of the gate. The lever is of substantially bell-crank form, and when it is swung over from the position illustrated in Fig. 1 to that shown in Fig. 2 the link and the flexible connection are arranged below the fulcrum of the lever, and the latter is retained in such position in engagement with the gate by the weight of the gate. The short arm of the lever is arranged at an angle to the long arm of the lever and carries the projection 25, which forms a stop for the lever when the latter is arranged as shown in Fig. 2, and the long arm is provided with a suitable handle or grip 28 to enable the lever to be readily oscillated to raise and lower the gate. When the lever is oscillated and moved from the position shown in Fig. 1 to that illustrated in Fig. 2, the gate is raised by reason of the flexible connection being carried forward.

When the gate is opened, it is engaged by one of a pair of supplemental pivoted latches 29, mounted on supplemental latch-posts 30, located at opposite sides of the gate, as clearly shown in Fig. 1.

It will be seen that the gate is exceedingly simple and inexpensive in construction, that it is strong and durable, and that it is readily opened in either direction. It will also be apparent that the gate may be readily raised to enable it to swing clear of snow-drifts and also to afford a passage for small animals.

What I claim is—

1. The combination with a support having a pintle-rod, of a swinging gate slidably mounted on the pintle-rod and having a pulley, a flexible connection passing around the pulley and connected with the support, and the two-armed lever having a terminal transverse projection on one arm connected with the said flexible connection so that when the said projection is swung below the fulcrum-point of the lever into engagement with the gate, the weight of the gate will hold the lever against backward movement, substantially as described.

2. The combination of a hinge-post, a swinging gate mounted on the hinge-post and capable of vertical movement, a flexible connection slidably engaging the gate and extending upward therefrom and connected with the hinge-post, and a two-armed lever fulcrumed on the gate and having one of its arms connected with the said flexible connection and arranged to engage the gate so that when such arm is swung downward below the fulcrum-point of the lever into engagement with the gate, the weight of the gate will hold the lever against backward movement, substantially as described.

3. The combination of a support, a pintle-rod mounted on the support, a swinging gate hinged to the pintle-rod and slidably connected therewith, an arm extending from the support and located above the gate, a pulley mounted on the gate, a flexible connection arranged on the pulley and provided at its ends with links 21 and 24, the link 21 having a hook detachably engaging the said arm, and a two-armed lever fulcrumed on the gate and having a terminal transverse projection on one of its arms connected with the link 24 so that when such projection is swung below the fulcrum-point of the lever into engagement with the gate, the weight of the gate will hold the lever against backward movement.

In testimony that I claim the foregoing as my own I have hereto affixed my signature in the presence of two witnesses.

EBER W. PRATT.

Witnesses:
 ALBERT BRUKEDLER,
 J. A. MORRISON.